United States Patent [19]
Goodman

[11] Patent Number: 5,230,362
[45] Date of Patent: Jul. 27, 1993

[54] COMPENSATED PRESSURE CONTROLLER

[75] Inventor: Robert B. Goodman, West Hartford, Conn.

[73] Assignee: United Technologies Corporation, Hartford, Conn.

[21] Appl. No.: 778,910

[22] PCT Filed: Jul. 24, 1989

[86] PCT No.: PCT/US89/03137
§ 371 Date: Dec. 26, 1991
§ 102(e) Date: Dec. 26, 1991

[51] Int. Cl.⁵ .................................. G05D 16/00
[52] U.S. Cl. .................................. 137/489; 137/82
[58] Field of Search ..................... 137/82, 489

[56] References Cited
U.S. PATENT DOCUMENTS

| | | |
|---|---|---|
| 3,047,010 | 7/1962 | Rothfuss . |
| 4,083,375 | 4/1978 | Johnson . |
| 4,228,819 | 10/1980 | Kruse et al. . |
| 4,253,484 | 3/1981 | Danon et al. . |
| 4,300,748 | 11/1981 | Kreeley . |

Primary Examiner—Gerald A. Michalsky
Attorney, Agent, or Firm—Troxell K. Snyder

[57] ABSTRACT

A pneumatic pressure controller includes an actuator (50) and a throttling valve (12) for regulating a flow of gas (10). A pressure comparator (22) provides a modulated pressure signal (58) to the controller (50). The pressure comparator (22) includes an outlet orifice (70) for compensating at elevated supply pressures, $P_{SUP}$.

3 Claims, 1 Drawing Sheet

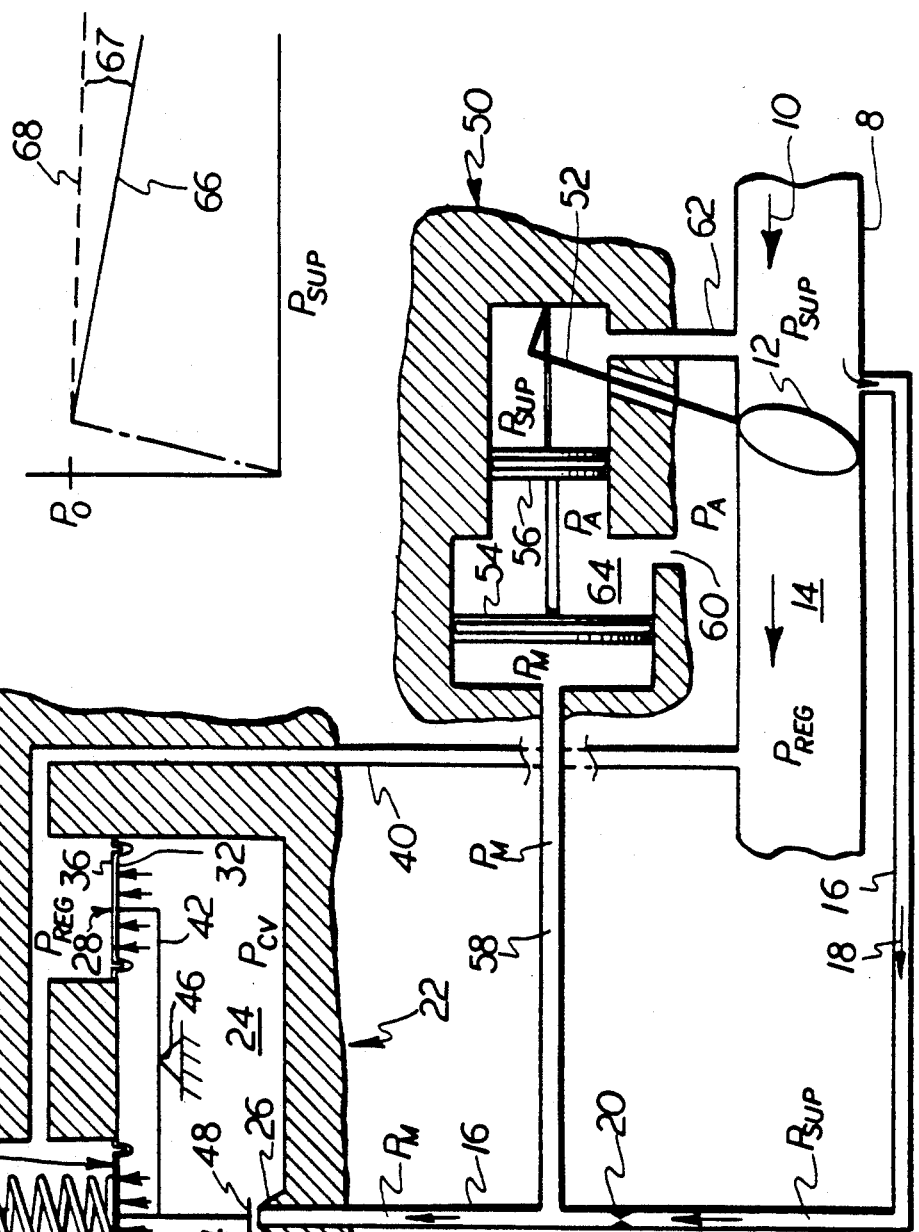

COMPENSATED PRESSURE CONTROLLER

FIELD OF THE INVENTION

The present invention relates to a fluid pressure controller with self-compensation for elevated fluid supply pressure.

BACKGROUND

Pneumatic pressure controllers for regulating a flow of fluid between a high pressure source of supply and a regulated, lower pressure environment are well known. Such controllers monitor the regulated pressure downstream of a throttling valve and compare it to the ambient pressure for producing a modulated actuator control pressure signal. The actuator signal drives an pneumatic actuator for positioning the control valve and thereby throttling the control valve from the supply source.

One common method of achieving the modulated actuator pressure signal is by means of a control nozzle having a variable flow restrictor driven by a mechanical linkage coupled to a differential pressure diaphragm. The diaphragm compares the pressure downstream of the throttle or control valve against an ambient or other reference pressure, varying the discharge area of the control nozzle and hence, the upstream nozzle pressure.

An actuator control conduit transmits the upstream nozzle pressure to an pneumatic actuator which in turn positions the throttle valve for regulating the pressure downstream. Such controllers typically use the fluid from the high pressure supply to feed the control nozzle and position the pneumatic actuator and hence may be subject to errors introduced as the supply source pressure is increased.

One such error may arise in a controller arrangement in which this pneumatic actuator is of the "half-area" type. Such actuators include two linked, differential area pistons which are separately pressurized by the fluid supply source and the modulated upstream nozzle pressure. Modulated pressure therefore rises with increased supply pressure.

As the required modulated pressure increases, the pressure on the nozzle restrictor plate also increases contributing to a droop in actual regulated pressure downstream of the valve as the linkage is driven backward by the static pressure on the restrictor plate. This error is further compounded by the need to increase the size and flow capability of the control nozzle and control conduit to allow for the possibility of increased leakage in the pneumatic actuator which may result from the increased pressure requirement. A larger control nozzle, of course, requires a larger restrictor plate thereby further elevating the backforce on the deflector plate.

One prior art solution to this problem is to increase the area of the pressure deflectable diaphragm, however, it will be appreciated that the use of larger and, therefore, heavier components alters the dynamic response of the controller possibly reducing the initial response time due to the increased component mass, as well as altering the damping characteristics of the linkage and diaphragm such that undesirable pressure fluctuations could occur during certain operating conditions.

What is required is a pressure controller which is able to compensate for increased supply pressure and control nozzle flow without altering the mechanical configuration and size of the nozzle flow restrictor linkage in the pressure comparator.

DISCLOSURE OF THE INVENTION

It is therefore an object of the present invention to provide a fluid pressure controller for maintaining a constant regulated fluid pressure from a variable supply pressure.

According to the present invention, a pressure controller for providing a modulated actuator pressure signal includes a control volume receiving a flow of fluid from the high pressure fluid supply source. The controller further includes a control nozzle for discharging the control fluid into the volume and a variable nozzle flow restrictor responsive to the static pressure differential between the interior of the control volume and the current regulated fluid pressure. The nozzle restrictor acts to modulate the control fluid pressure upstream of the discharging control nozzle, with the upstream pressure being delivered by means of an actuator conduit to an pneumatic actuator for positioning a throttling control valve disposed between the high pressure fluid supply and the regulated fluid pressure volume.

The present invention avoids the droop in regulated pressure which occurs in the prior art in higher supply pressures by providing a restricted vent opening through which the discharged control fluid exits the control volume to the ambient surroundings. The restricted vent results in an elevated static fluid pressure within the control volume at higher control fluid flow rates corresponding to elevated fluid supply pressures. The higher fluid pressure in the control volume provides a correcting force on the nozzle restrictor, via the diaphragm and mechanical linkage, compensating for the increased nozzle static discharge pressure.

The controller according the present invention, is self-compensating with respect to increased fluid supply pressures and therefore able to accommodate elevated pressures and increased control fluid flow rates without requiring any deleterious modification of the controller mechanical design or dynamics.

Both these and other objects and advantages of the pressure controller according to the present invention will be apparent to those skilled in the art following a review of the following detailed description and the appended claims and drawing figures.

BRIEF DESCRIPTION OF THE DRAWINGS

FIG. 1 shows a schematic arrangement of a pressure controller, actuator, and throttle valve, according to the present invention.

FIG. 2 shows a detailed view of the control nozzle and pressure restrictor.

FIG. 3 compares the performance of the controller according to the present invention with a prior art pressure controller.

DETAILED DESCRIPTION

Referring now to the drawing figures, and in particular to FIG. 1 thereof, the pressure controller according to the present invention will be disclosed in detail. FIG. 1 shows a ducts with flow of pressurized fluid 10 passing through a throttling valve 12 and into a lower pressure zone 14 in which the static fluid pressure, $P_{REG}$ is to be regulated at a pre-selected magnitude. A portion of the main fluid flow 10 is diverted from the duct 8 upstream of the throttling valve 12 into a first control conduit 16. The control fluid flow 18 in the control conduit 16 passes through a flow regulating orifice 20 at sonic velocity thus achieving "choked" flow through the nozzle under normally expected supply, $P_{SUP}$, and downstream, $P_M$, pressures.

The choked flow regime occurs when the pressure ratio $P_M/P_{SUP}$ across the orifice 20 is less than a critical pressure ratio which corresponds to the acceleration of the fluid flowing through such orifice to sonic velocity. One characteristic of choked flow is the non-responsiveness of the fluid mass flow rate to downstream static pressure, $P_M$. As is well known in the art of compressible of fluid dynamics, the mass flow of compressible fluid through a choked orifice is a function of the upstream pressure and temperature only. Hence, for the orifice 20 in the control conduit 16:

$$W_{20} = .5342_0 C_D P_{SUP}/ \sqrt{T_{SUP}}$$

wherein:

$W_{20}$ equals mass flow through the constriction 20;
$A_{20}$ equals cross sectional air flow area of the orifice 20;
$C_B$ equals the discharge coefficient of the orifice 20;
$P_{SUP}$ equals absolute fluid pressure upstream of the throttling valve 12; and
$T_{SUP}$ equals absolute fluid temperature of the fluid upstream of the throttling valve 12.

Control fluid 18, after flowing past the restriction 20, continues into the pressure comparator 22 of the pressure controller, discharging into a internal control volume 24 via a control or discharge nozzle 26. The pressure comparator 22 includes a first and a second diaphragm 28, 30 each having a control volume facing side 32, 34 and an opposite side 36, 38 which is in fluid communication with the regulated pressure volume 14 downstream of the throttling valve 12 by means of a second control conduit 40.

The area of the first diaphragm 28 is larger than the area of the second diaphragm 30, with the center of the two diaphragms 28, 30 connected by a pivoted balance beam 42. The second diaphragm 30 may also include a spring 44 or other urging means for achieving an equilibrium force balance about the balance pivot 46. Also included within the pressure comparator 22 is a control nozzle flow restrictor 48 which is secured to one end of the balance beam 42 and which moves in response to deflections of the balance beam 42 as discussed below.

As will be appreciated by those skilled in the art, variations in the regulated pressure $P_{REG}$ alter the force balance on the balance beam 42 thereby causing the balance beam 42 to deflect until the urging spring 44 is compressed or relaxed sufficiently to re-establish the equilibrium force balance. Such deflections of the balance beam 42 cause the flow restrictor 48 to approach or withdraw with respect to the discharge nozzle 26 thereby varying the effective nozzle outlet area and increasing or decreasing the pressure in the first control conduit 16 between the flow constrictor 20 and the discharge nozzle 26. This varying, modulated pressure $P_M$ is the pressure signal used by the controller according to the present invention to activate an pneumatic actuator 50 for repositioning the throttle valve 12 in order to maintain the pressure $P_{REG}$ within the controlled pressure volume 14.

Actuator 50 as shown in FIG. 1 is a "half area" actuator wherein a linkage 52 for positioning the valve 12 is driven by joined pistons 54, 56. Piston 54 is pressurized on one face thereof by the modulated pressure $P_M$ provided from the upstream side of the discharge nozzle 26 by an actuator conduit 58. The other face of the first piston 54 is exposed to ambient pressure $P_A$ within the interior 64 of the actuator 50 via ambient pressure vent 60. The second piston 56 is sized to have one-half the surface area of the first piston 54 and is pressurized at one face thereof by the supply pressure $P_{SUP}$ provided by supply pressure conduit 62. The opposite surface of the second piston 56 likewise faces the central ambient pressure cavity 64 within the actuator 50.

The function of the actuator 50 should now be readily apparent. Modulated pressure $P_M$ is maintained by the flow restrictor 48 and control nozzle 26 at approximately one-half the supply pressure $P_{SUP}$, thereby achieving a force balance on the joined pistons 54, 56 within the actuator 50. Should regulated pressure fall below the pre-selected level, balance beam 42 is deflected by the combined pressure and urging forces on the diaphragms 28, 30 thereby restricting the flow of control fluid 18 from the control nozzle 26, increasing the pressure $P_M$ upstream of the nozzle 26 and urging driving pistons 54, 56 toward the right in FIG. 1. Such movement corresponds to opening of the throttle valve 12 thereby admitting a greater flow of fluid 10 into the control pressure volume 14, thereby restoring the pressure level to the pre-selected level. An excess of pressure on the downstream side of the valve 12, would, of course, produce the opposite effects and actions within the controller according to the present invention, thereby closing the throttling valve 12 and again correcting the downstream over pressure.

FIG. 3 shows a curve 66 representing the performance of an prior art pressure controller and a second curve 68 showing the performance of the pressure controller according to the present invention. As supply pressure increases, the regulated pressure in the volume 14 downstream at the throttling 12 for a prior art controller is observed to droop 67 below the selected pressure $P_O$.

The cause of this droop is best explained with reference to FIG. 2 which is an enlarged detail of the control nozzle 26 within the control volume 24 of the pressure comparator 22. As can be seen in FIG. 2, the control conduit 16 provides a flow 18 of control fluid which exits the nozzle 26 into the control volume 24.

Flow restrictor 48 is positioned adjacent the control nozzle 26 for restricting the flow therefrom, thereby maintaining the pressure of $P_M$ upstream of the nozzle 26 at approximately one-half the supply pressure $P_{SUP}$. Flow restrictor 48 is urged away from the nozzle 26 by the static pressure $P_M$. This force, calculated as the product of the nozzle area, $A_N$ and the control nozzle pressure $P_M$ can be sufficient to alter the force balance on the balance beam 42, causing the flow restrictor to be pushed away from the nozzle 26 thus reducing the actuator control pressure signal $P_M$. This reduction increases with increasing supply pressure thus resulting in the droop 67 below the desired regulated pressure $P_O$ as shown in FIG. 3.

The controller according to the present invention provides a means for compensating against such droop caused by elevated supply pressure. The present invention provides a vent orifice 70 disposed at the outlet of the control volume 24 through which substantially all of the control fluid flow 18 exits to the surroundings. By properly sizing the vent orifice 70, the pressure $P_{CI}$ within the control volume 24 can be made to increase as the control fluid flow 18 increases as a function of the supply pressure $P_{SUP}$. Hence, the increased back pressure within the control volume $P_{CI}$ provides a correcting force on the diagrams 28, 30 for urging the flow restrictor 48 towards the nozzle 26 and reducing the pressure differential across the flow restrictor 48, thereby maintaining the modulating pressure $P_M$ within the control conduit 16.

The resulting performance curve 68 shown in FIG. 3 shows the controller according to the present invention as correcting substantially all the droop experienced by prior art controllers. Proper sizing of the vent orifice 70 with respect to the expected supply and ambient pressures, $P_{SUP}$, $P_A$ will enable the controller according to the present invention to maintain the regulated pressure $P_{REG}$ in the regulated volume 14 at the preselected $P_O$ even at elevated supply pressures $P_{SUP}$.

A typical range of supply pressures which may be accommodated by the controller according to the present invention is in the range of 100 to 450 psia, (690–3100 kPa) with the preselected regulated pressure $P_O$ being approximately 100 psia (690 kPa).

It will be further appreciated by those skilled in the art that the compensating means according to the present invention does not require resizing of the deflecting diaphragms 28, 30, the balance beam 42, or other components such as the actuator 50 of the prior art pressure controller. Hence, the controller according to the present invention maintains the same dynamic response/damping as the prior art configuration and does not require the use of heavier or larger components to accommodate the higher supply and modulated pressures.

It will be further be appreciated by those skilled in the art that the embodiment described and illustrated herein is but one of a variety of equivalent embodiments which may occur to those skilled in the are and which is therefore is presented herein as being merely illustrative of the present invention and is not to be interpreted as limiting the scope thereof.

I claim:

1. In a fluid pressure regulator having a control valve disposed in a fluid conveying duct, the fluid upstream of the valve being supplied at a first, higher pressure and the fluid downstream of the valve being regulated to a second, lower pressure, the regulator further including:
   a first control conduit receiving a control flow fluid from the duct upstream of the control valve and discharging the control flow of fluid from a control nozzle into a control volume,
   an orifice, disposed in the first control conduit and sized to result in the control flow of fluid therethrough being within the choke flow regime,
   a differential pressure deflectable diaphragm having a first side facing the interior of the control volume and a second side in fluid communication with the duct downstream of the control valve via a second control conduit,
   means, responsive to deflection of the diaphragm, for restricting the control flow of fluid at the control nozzle, and
   an actuator conduit, connected to the first control conduit at a point intermediate the sized orifice and the control nozzle, the actuator conduit delivering a modulated control pressure actuation signal to an pneumatic valve actuator cooperatively linked to the control valve, wherein the improvement comprises,
   a vent orifice disposed between the interior of the control volume and the controller surroundings, said vent orifice venting the entire control flow of fluid from the control volume to the surroundings, said vent orifice further being sized to result in an elevated static fluid pressure within the control volume as compared with ambient static pressure during periods of relatively high control fluid flow.

2. In a controller providing a modulated actuator pressure signal to an actuator positioning a throttling valve disposed in a duct so as to maintain a predetermined pressure differential between the fluid static pressure in the duct downstream of the throttling valve and the ambient fluid static pressure, the controller including:
   a control nozzle delivering a control flow of fluid diverted from the duct upstream of the throttling valve into the interior of a control volume, wherein the rate of control fluid flow is defined by a choking orifice disposed upstream of the control nozzle and sized to achieve choked regime fluid flow therethrough over an operating range of fluid static pressure upstream of the throttling valve,
   means, responsive to the differential fluid static pressure in the duct downstream of the throttling valve and within a control volume, for restricting the flow of control fluid discharged from the control nozzle, whereby the control fluid pressure upstream of the nozzle is modulated,
   an actuator control pressure signal conduit providing fluid communication between the control fluid flowing between the choking orifice and the control nozzle and the actuator, whereby the modulated control fluid pressure signal is provided to the actuator,
   the improvement comprising,
   a sized vent opening to the ambient environment for exhausting the flow of control fluid from the control volume, said vent having a flow area sized to induce a pressure drop across said vent at control fluid flow rates corresponding to fluid pressure levels upstream of the throttling valve in at least a higher portion of the fluid supply pressure range.

3. A controller for delivering an actuating control signal to an actuator for positioning a control valve throttling a main flow of fluid from an upstream, elevated pressure fluid source to a downstream, lower pressure, regulated pressure volume, wherein the controller comprises,
   a control volume having a vent opening therein for establishing fluid communication between the control volume interior and the ambient surroundings of the controller,
   a control nozzle receiving a control flow of fluid from a first control conduit, the first control conduit adapted to receive the control fluid flow from the main fluid flow at a point upstream of the control valve,
   means, responsive to differential static pressure between a first and a second inlet thereof, for restricting the control flow of fluid at the control nozzle, the restricting means first inlet static pressure being equal to the static pressure in the control volume, and the restricting means second inlet static pressure being equal to the static pressure at the regulated downstream volume, wherein the first control conduit contains a first orifice to establish choked regime fluid flow therethrough and an actuator conduit joined to the first control conduit at a point intermediate the first orifice and the control nozzle, the actuator conduit further connected to the control valve actuator, and wherein the control volume vent includes a second orifice sized to restrict the control flow of fluid discharged from the control volume, the second orifice further sized to achieve an elevated control volume interior static pressure at elevated control fluid flow rates.

* * * * *